United States Patent
Heinonen (10) Patent No.: US 9,562,771 B2
(45) Date of Patent: Feb. 7, 2017

(54) ANALYSIS OF SENSOR DATA (71) Applicant: Sharper Shape Ltd, Helsinki (FI)

(72) Inventor: Tero Heinonen, Helsinki (FI)

(*) Notice: Subject to any disclaimer, the term of this patent is extended or adjusted under 35 U.S.C. 154(b) by 358 days.

(21) Appl. No.: 14/177,053

(22) Filed: Feb. 10, 2014

(65) Prior Publication Data
US 2014/0172357 A1   Jun. 19, 2014

(30) Foreign Application Priority Data

Dec. 18, 2013  (FI) ..................................... 20136288
Dec. 18, 2013  (FI) ..................................... 20136289
Dec. 18, 2013  (FI) ..................................... 20136290
Dec. 18, 2013  (FI) ..................................... 20136291

(51) Int. Cl.
*G01B 21/16* (2006.01)
*G01C 21/00* (2006.01)

(52) U.S. Cl.
CPC .................... *G01C 21/005* (2013.01)

(58) Field of Classification Search
CPC .... G01C 21/005; G06K 9/3208; G06K 9/324; G06K 9/58; G06K 9/746
USPC 702/150; 348/135, 169, 117, E7.085; 701/2, 30.6; 1/1; 382/103
See application file for complete search history.

(56) References Cited

U.S. PATENT DOCUMENTS

| | | | |
|---|---|---|---|
| 5,132,831 A | 7/1992 | Shih et al. | |
| 5,330,523 A | 7/1994 | Campbell et al. | |
| 5,525,722 A | 6/1996 | Nakamura et al. | |
| 6,341,013 B1* | 1/2002 | Battiti | G01B 11/2755 33/203.18 |
| 7,505,609 B1* | 3/2009 | Hartman | G06K 9/3208 382/103 |
| 8,265,800 B2* | 9/2012 | Smith | H04L 67/12 244/190 |
| 8,797,400 B2* | 8/2014 | Rinner | G06T 3/40 348/117 |
| 8,902,308 B2* | 12/2014 | Rinner | G06T 7/0028 348/117 |

(Continued)

OTHER PUBLICATIONS

Ali, La. Compression of LiDAR data using spatial clustering and optimal plane-fitting. Advances in REmote Sensing, vol. 2 No. 2, 2013, pp. 58-62, doi:10.4236/ars.2013.22008. Published online Jun. 2013. Retrieved from http:/Iscirp. Drgijoumaliars/ on Jun. 12th, 2014.

(Continued)

*Primary Examiner* — Carol S Tsai
(74) *Attorney, Agent, or Firm* — MP Patents, LLC (57) ABSTRACT

The present disclosure provides a method, system and a computer program product for remote sensing. The method, system and the computer program product include a vehicle including a plurality of sensors configured to measure position and pose of the vehicle and to collect spatial data of a discovered object. In addition, the method, system and a computer program product include a storage having an object model database, a processor and a memory. The memory includes a comparison engine configured to compare the discovered object spatial data with spatial data in the object model database and a position and pose calculator arranged to calculate position and pose of the vehicle from the discovered object spatial data when the discovered object spatial data matches spatial data of a model object in the object model database.

11 Claims, 7 Drawing Sheets

(56) References Cited

U.S. PATENT DOCUMENTS

| | | | |
|---|---|---|---|
| 8,971,571 B1* | 3/2015 | Starner | G06K 9/00671 |
| | | | 382/103 |
| 8,982,669 B2* | 3/2015 | Barthel | G01S 7/412 |
| | | | 367/99 |
| 9,104,202 B2* | 8/2015 | Pack | G05D 1/0038 |
| 9,221,536 B2* | 12/2015 | Wang | B64C 39/024 |
| 2006/0154713 A1* | 7/2006 | Sunazuka | A63F 13/12 |
| | | | 463/6 |
| 2008/0125920 A1* | 5/2008 | Miles | B64C 39/024 |
| | | | 701/2 |
| 2009/0185741 A1 | 7/2009 | Nahari et al. | |
| 2010/0166260 A1 | 7/2010 | Huang et al. | |
| 2010/0198775 A1 | 8/2010 | Rousselle et al. | |
| 2010/0250482 A1 | 9/2010 | Ma | |
| 2012/0050524 A1* | 3/2012 | Rinner | G06T 7/0028 |
| | | | 348/117 |
| 2012/0050525 A1* | 3/2012 | Rinner | G06T 7/0028 |
| | | | 348/117 |
| 2012/0095619 A1* | 4/2012 | Pack | G05D 1/0038 |
| | | | 701/2 |
| 2012/0124113 A1 | 5/2012 | Zalik et al. | |
| 2012/0293356 A1* | 11/2012 | Barthel | G01S 7/412 |
| | | | 342/27 |
| 2012/0317773 A1* | 12/2012 | Hale | F41G 3/323 |
| | | | 29/407.09 |
| 2013/0076862 A1* | 3/2013 | Ohtomo | G01C 11/025 |
| | | | 348/46 |
| 2013/0202197 A1 | 8/2013 | Reeler et al. | |
| 2014/0142800 A1* | 5/2014 | Zeng | G06F 11/3055 |
| | | | 701/30.6 |
| 2015/0197007 A1* | 7/2015 | Pack | G05D 1/0038 |
| | | | 701/2 |

OTHER PUBLICATIONS

Finnish Patent and Registration Office; Office Action, Application 20136289, Tomi Koskinen, Aug. 19, 2014.

Finnish Patent and Registration Office; Office Action, Application 20136290, Tomi Koskinen, Aug. 22, 2014.

Finnish Patent and Registration Office; Search Report, Application No. 20136291, Tomi Koskinen, Sep. 2, 2014.

Finnish Patent and Registration; Office Action, Application 20136288, Tomi Koskinen, Jun. 25, 2014.

Hyyppa, J. et al. Improving automation in map updating based on national laser scanning, classification trees, object-based change detection and 3D object reconstruction. Urban Remote Sensing Joint Event, Apr. 11-13, 2007. Paris, France. IEEE. pp. 1-10, ISBN 978-1-4244-0711-8; ISBN 1-4244-0711-7. EPOQUENET NPL: XP031177679. doi: 10.1109/URS2007.371857 abstract; section ILA, item 7; section III, par. 1; section IV, pars. 1-2, 9.

* cited by examiner

ANALYSIS OF SENSOR DATA

CROSS REFERENCE TO RELATED APPLICATIONS

This application claims the priority benefit of Finnish patent application FI 20136289 filed Dec. 18, 2013 and entitled 'Method for detecting objects by object types'; Finnish patent application FI 20136290 filed Dec. 18, 2013 and entitled 'Method for detecting objects using updateable spatial knowledge'; and Finnish application FI 20136291 filed Dec. 18, 2013 and entitled 'Method for creating observations about objects' which are incorporated herein by reference in their entirety.

TECHNICAL FIELD

The present disclosure relates to collecting data of remote objects by flying devices and, in particular, relates to analysis of collected data of remote objects by flying devices.

BACKGROUND

With the advancement in technology, there has been increasing interest in collecting data from flying vehicles. Examples of flying vehicles include but is not limited to airplane, helicopter, unmanned aerial vehicle, satellite, balloon (hereinafter jointly referred to as UAV). Flying vehicles offer significant advantage over ground based sensing of mobility by providing an ability to be deployed remotely and to quickly and easily cover large areas. This capability allows acquiring remote intelligence from a safe standoff distance and offers a unique data collection tool. Data can be obtained for different real life events from these flying vehicles. For example, data can be collected to monitor physical properties of a power line network, measure forest growth, and measure construction of houses, analyze moving objects, initialize weapons and the like. Data can be spatial (geometrical) information of real world objects present in geographical area and can be collected by arrangement of sensors in flying vehicles. Collected data can include positioning data, observation data and the like. Positioning data includes but is not limited to WGS-84 (GPS coordinates) including altitude or relative position and pose to one or more objects or to one or more other UAV's. On the other hand, observation data includes but is not limited to information collected by cameras (2D, 3D, infrared, high definition, high frequency and the like), and measurements from temperature sensor, Lidar, audio sensor and X-rays.

A typical system for the above stated requirement includes a UAV to collect positioning and observation data and storage medium (SSD, flash memory, CD-ROM, hard disk and the like) to store the collected data. However, in the traditional system, the data needs to be transmitted physically for analysis, as no communication device is capable of handling the large amount of data frequently on the order of tens of terabytes. Moreover, the speed of data collected by multiple sensor devices in flying vehicles is not compatible with the current communication systems. In addition, the present systems do not allow error correction in the measured data during the collection of the observations. Further, the systems do not allow real time analysis of data and thus only provide static analyses after the fact. This eliminates the possibility of making quick analysis to enable a reaction analysis results in real time.

In addition, due to multiple steps required in long processing cycle, manual intervention for handling and analysis of data is required. However, manual intervention may result in quality risks, long delays in processing, and other similar problems.

SUMMARY

The present disclosure provides a computer-implemented method for remote sensing. The computer implemented method includes measuring position and pose of a moving vehicle and collecting spatial data of a discovered object with sensors of the moving vehicle. In addition, the computer implement method includes comparing the discovered object spatial data with spatial data in an object model database stored at the moving vehicle and calculating position and pose of the vehicle from the discovered object spatial data when the discovered object spatial data matches spatial data of a model object in the object model database.

In an example, the computer-implemented method may further include recording the discovered object spatial data in the object model database when the discovered object spatial data does not match spatial data of a model object in the object model database.

In an example, the computer-implemented method may further comprise processing calculated position and pose of the vehicle with the measured position and pose of the vehicle to yield an enhanced position and pose.

In an example, the computer-implemented method may further comprise collecting position and pose data of the discovered object and comparing the discovered object position and pose data with position and pose data of a model object the discovered object matches. The action of updating the position and pose data in the object model database when the position and pose data of the discovered object does not match the position and pose data of the model object may also be included.

In an example, the computer-implemented method may further include employing spatial, position and pose data of a model object in the object model database to search for a real object using the sensors and changing position and pose of the vehicle and researching for the real object when the real object is not sensed at the position of the model object.

In an example, the computer-implemented method may further include employing spatial, position and pose data of a model object in the object model database to search for a real object using the sensors and changing pose or parameters of at least one of the sensors and researching for the real object when the real object is not sensed at the position of the model object.

In an example, the computer-implemented method may further include, when the discovered object does not match a model object in the object model database, changing position and pose of the vehicle; and repeating the collecting and comparing actions.

According to another aspect, the present disclosure provides a computer program product for remote sensing. The computer program product resides on a non-transitory computer-readable storage medium and comprising instructions. These instructions when executed by a processor, cause a computer to measure position and pose of a moving vehicle and collect spatial data of a discovered object with sensors of the moving vehicle. In addition, these instructions causes the computer to compare the discovered object spatial data with spatial data in an object model database stored at the moving vehicle and calculate position and pose of the vehicle from the discovered object spatial data when the discovered object spatial data matches spatial data of a model object in the object model database.

In an example, the instructions may further cause the computer to record the discovered object spatial data in the object model database when the discovered object spatial data does not match spatial data of a model object in the object model database.

In an example, the instructions may further cause the computer to processes calculated position and pose of the vehicle with the measured position and pose of the vehicle to yield an enhanced position and pose.

In an example, the instructions may further cause the computer to collect position and pose data of the discovered object and compare the discovered object position and pose data with position and pose data of a model object the discovered object matches. In accordance with the instructions, the computer may also update the position and pose data in the object model database when the position and pose data of the discovered object does not match the position and pose data of the model object.

In an example, the instructions may further cause the computer to employ spatial, position and pose data of a model object in the object model database to search for a real object using the sensors and change position and pose of the vehicle and research for the real object when the real object is not sensed at the position of the model object.

In an example, the instructions may further cause the computer to employ spatial, position and pose data of a model object in the object model database to search for a real object using the sensors and change pose or parameters of at least one of the sensors and research for the real object when the real object is not sensed at the position of the model object.

In an example, when the discovered object does not match a model object in the object model database, the instructions further cause the computer to change position and pose of the vehicle and repeat the collection and comparison actions.

In an example, when the discovered object does not match a model object in the object model database, the instructions further cause the computer to change pose or parameters of at least one of sensors and repeat the collection and comparison actions.

According to yet another aspect, the present disclosure provides a system for remote sensing. The system includes a vehicle including a plurality of sensors configured to measure position and pose of the vehicle and to collect spatial data of a discovered object. In addition, the system includes a storage including an object model database, a processor and a memory. The memory includes a comparison engine configured to compare the discovered object spatial data with spatial data in the object model database and a position and pose calculator arranged to calculate position and pose of the vehicle from the discovered object spatial data when the discovered object spatial data matches spatial data of a model object in the object model database.

In an example, the system may further include an updater configured to record the discovered object spatial data in the object model database when the discovered object spatial data does not match spatial data of a model object in the object model database.

In an example, the plurality of sensors may additionally be configured to collect position and pose data of the discovered object, the comparison engine may additionally be configured to compare the discovered object position and pose data with position and pose data of a model object the discovered object matches and the updater may additionally be configured to update the position and pose data in the object model database when the position and pose data of the discovered object does not match the position and pose data of the model object.

In an example, the system may further include a search module configured to employ spatial, position and pose data of a model object in the object model database to search for a real object using the sensors and a navigator arranged to change position and pose of the vehicle to enable the search module to research for the real object when the real object is not sensed at the position of the model object.

In an example, the system may further include a navigator configured to change position and pose of the vehicle when the discovered object does not match a model object in the object model database. Further, the plurality of sensors may additionally be configured to repeat collection of spatial data and the comparison engine is configured to repeat comparison of the discovered object spatial data with spatial data in the object model database after the navigator has changed the position and the pose of the vehicle when the discovered object does not match a model object in the object model database.

DETAILED DESCRIPTION

In view of shortcomings of the prior art, there is a need for a method and a system which provides real time analysis of data with high speed processing, storage and transmission capability. Moreover, the method and system should be able to correct the collected data. In addition, the method and system should recognize previously detected or undetected objects based on measurements.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Figure 1A:
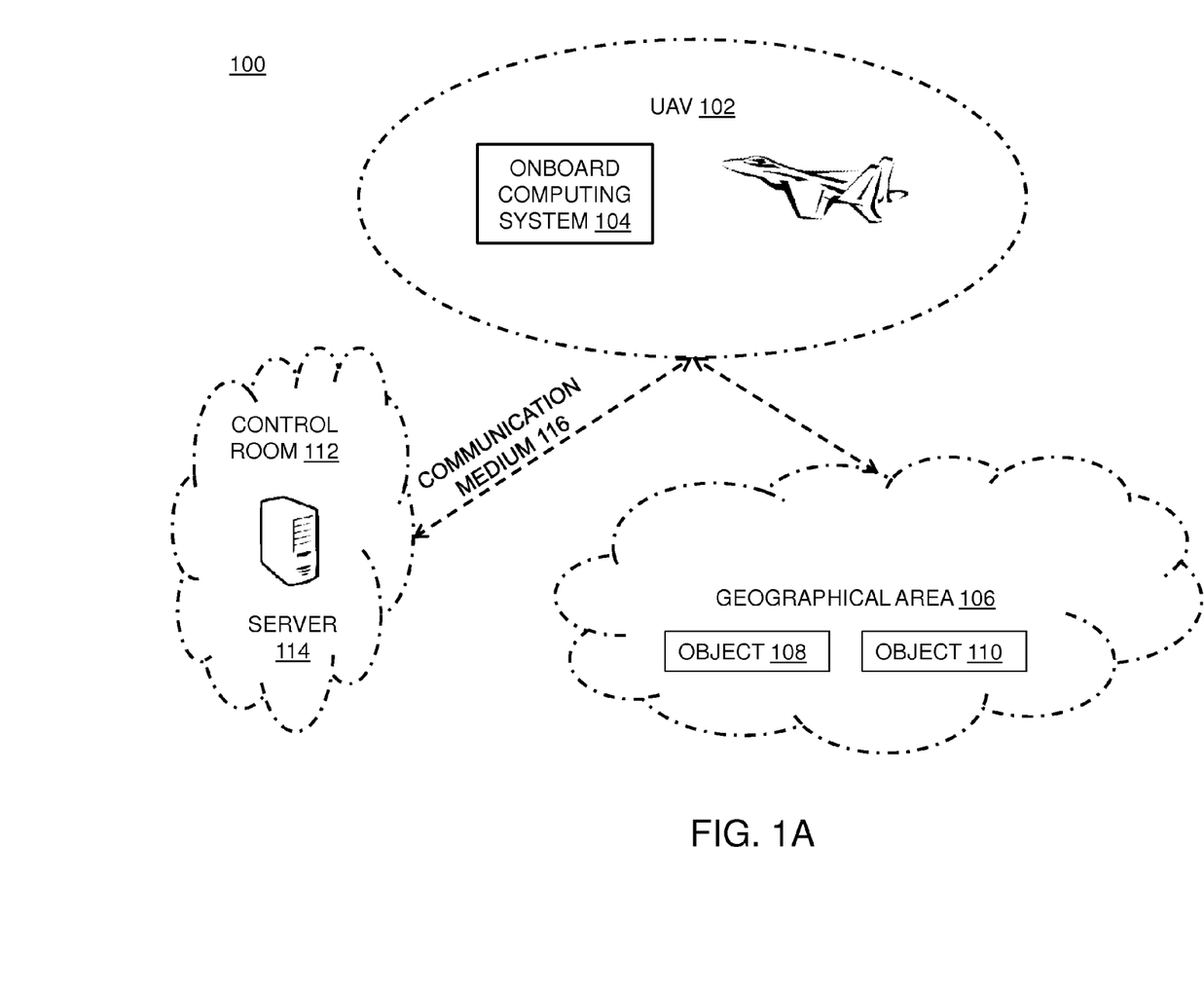
FIG. 1A illustrates a system for remote sensing having a unmanned aerial vehicle (UAV), in accordance with various embodiments of the present disclosure.

FIG. 1A illustrates a system 100 for remote sensing, in accordance with various embodiments of the present disclosure. The system 100 includes an Unmanned Aerial Vehicle (hereinafter UAV) 102 in a geographical area 106 and control room 112. The UAV 102 is a flying vehicle which flies over the geographical area 106 and collects measurement data of the geographical area 106. Examples of measurement data include but is not limited to spatial data such as orientation, type, and location of an object 108 and/or object 110 present (identified) in the geographical area 110. Examples of the objects 108 and 110 include but is not limited to rocks, cars, troops, and boats. The UAV 102 includes an on-board computing system 104 to analyze the data pertaining to the objects 108 and 110 in the geographical area 106. For example, the UAV 102 may collect and analyze data pertaining to the object 108 and may infer that the object 108 is a rock. In an embodiment of the present disclosure, the on board computing system 104 communicates the analysis of the data along with the collected data to the control room 112 in real time through a communication medium 116. An example of the communication medium 116 includes but is not limited to Internet. A server 114 of the control room 112 along with other essential equipment receives and stores the data (along with the analysis) in real time through the communication medium 116. The control room 112 monitors and controls the UAV 102 by sending important instructions. The onboard computing system 104 takes as input positioning data and observation data. In addition, the onboard computing system 104 uses pre populated object database in the UAV 102 to correlate measurements and make analysis of the data. Results of the analysis are communicated to the control room 112 for possible commands and actions related to the measurements.

Figure 1B:
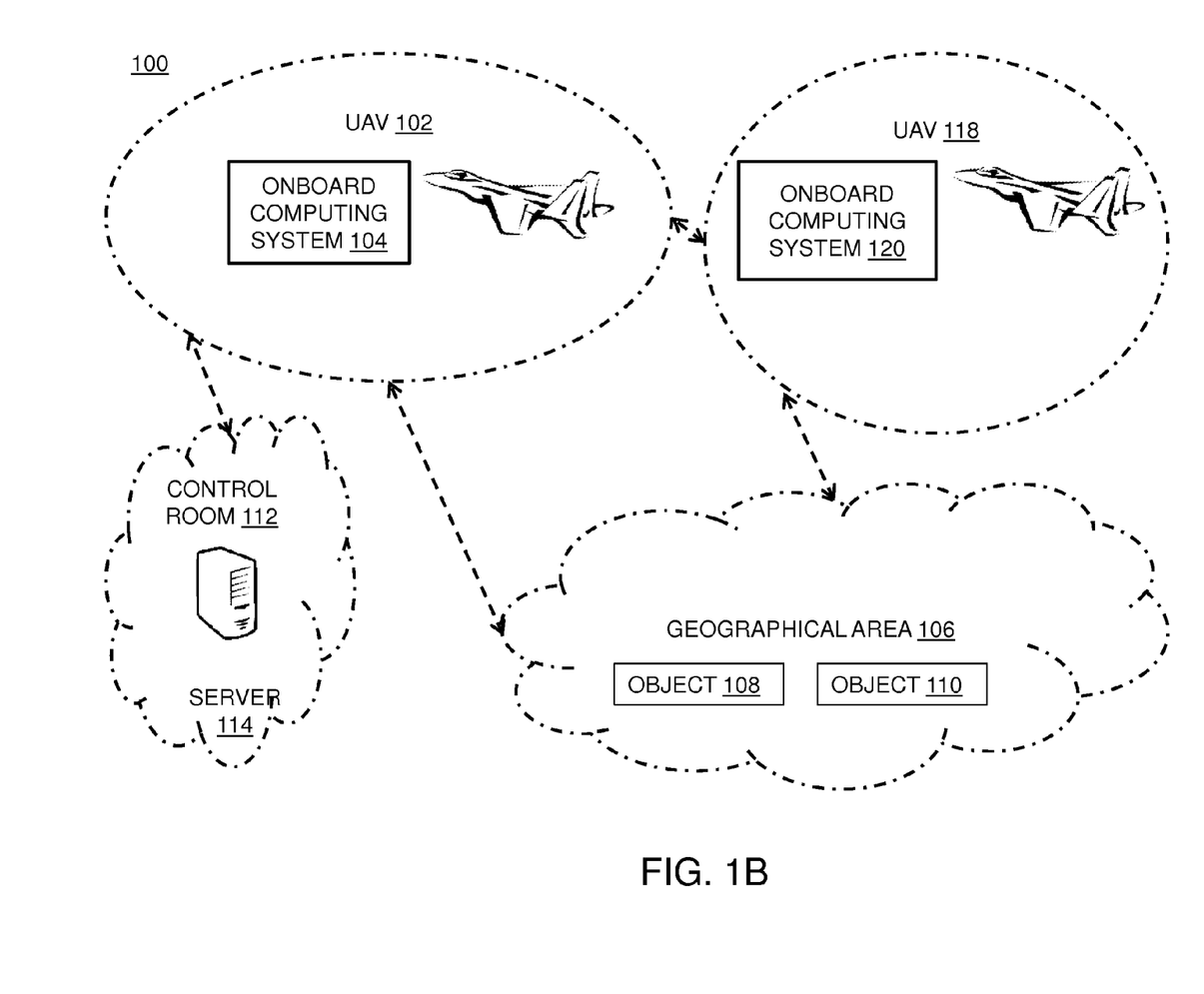
FIG. 1B illustrates the system for remote sensing having multiple unmanned aerial vehicles, in accordance with various embodiments of the present disclosure.

It may be noted that the system 100 of FIG. 1A is shown to include only one UAV 102; however, those skilled in the art would appreciate that system 100 may have one or more UAVs (like another UAV 118 having an on-board computing system 120 in FIG. 1B) which may fly over the geographical area 106. The UAV 102 may share the data with UAV 118 and with the control room 112 to avoid redundancy and errors in measurements. In addition, those skilled in the art would appreciate that there may be more objects which may be identified in the geographical area 106. The data may be collected for all these identified objects. In addition, the system 100 is shown to have a UAV 102; however, those skilled in the art would appreciate that any of the flying devices can collect and analyze the data. Examples of these flying devices include but is not limited to an airplane, a helicopter, a satellite and a balloon.

The UAV 102 and UAV 118 illustrated in the FIG. 1A and FIG. 1B may be applicable in different environments and for different purposes. For example, the UAV 102 may monitor physical properties of a power line network, make real measurements of forest growth, make measurements of housing (houses, buildings) in order to map "as built" situation, analyze moving objects such as cars, troops, boats, and the like, analyze changes in objects (such as change in position, opening doors, altering form of the house, initializing weapons (tilting missile launch tower), and the like.

Figure 2:
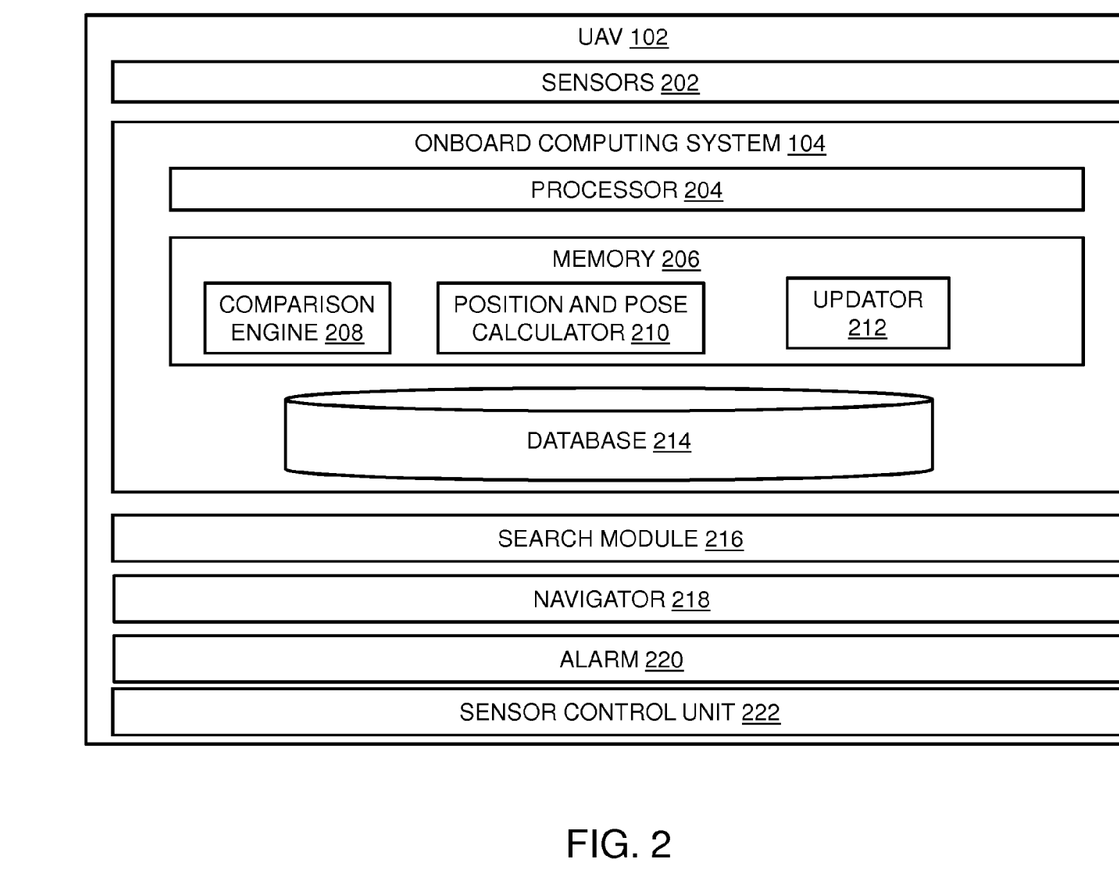
FIG. 2 illustrates various components of the UAV, in accordance with various embodiments of the present disclosure.

FIG. 2 illustrates various components of UAV 102, in accordance with various embodiments of the present disclosure. The UAV 102 includes a plurality of sensors 202 and the onboard computing system 104. The on-board computing system 104 includes a processor 204, a memory 206, and a database 214. In addition, the memory 206 includes a comparison engine 208, a position and pose calculator 210, and an updater 212. The plurality of sensors 202 measure positions and poses of the UAV 102 in accordance with certain pre-defined time intervals. In addition, the plurality of sensors 202 collects spatial data of the object 108 and/or object 110. The plurality of sensors 202 include but is not limited to electromagnetic spectrum sensors, gamma ray sensors, biological sensors, and chemical sensors. The electromagnetic sensors include visual spectrum, infrared, near infrared cameras, radar systems, electromagnetic wave detectors such as microwave and ultraviolet spectrum sensors and the like. In an embodiment of the present disclosure, the plurality of sensors 202 collects position and pose data of the discovered object (say object 108).

The database 214 has stored information pertaining to the different objects in the geographical area 106. For example, the database 214 may already have the information about the object 108 and the object 110 of the geographic area 106. In addition, the database 214 may have information related to the models of different objects. For example, the database 214 may have information related to the model/structure of a boat, rock, car and the like. In an embodiment of the present disclosure, the database 214 includes a specific object model database (shown in FIG. 5). The object model database is a data store where the known objects are stored and may also contain history of the data.

The object model database consists of data of objects 108 and 110 identified by one or more identifier and attributes. These attributes include but is not limited to name, code, type, color, classification, relation to other objects, and group. The object model database also includes spatial knowledge, such as location, form or shape of the objects 108 and 110. The object model database is implemented on board as a software program residing in RAM, a permanent storage in a storage device such as hard disk or SSD or a combination thereof. Some parts (or all) of the object model database content may be stored in a remote location (not on-board UAV) accessible over a wireless connection such as 3G or satellite data. The accessing of remote data may be on-demand basis, or based on preloading a subset or whole object model database content. The object model database provides caching at memory or disk level. Object model database changes may be dynamically updated to a remote location over wireless connection. The data synchronization and distribution may be time stamp based (latest information prevails in case of conflicts), master-slave configuration (master data prevails), or owner based (each object or object type) has an owner (one of UAV, or remote database), which has the priority on updates. A single data object be may concurrently stored as multiple copies in an object model database (e.g. in several UAVs, and in two remote location (for redundancy)).

The object model database may also contain prediction of the object properties in the future. For example when a moving car is recognized at least two times within a time interval it's then current velocity may be measured, velocity and direction may be stored as spatial information to the spatial knowledge record related to that object, and it's future location can be predicted (over a time frame). For a flying vehicle, the aviation kinematics sets the envelope of the possible maneuvers of the object in a time frame limiting the possible future locations of the object. The kinematic restrictions may include maximum G-force a manned aerial vehicle can sustain, maximum acceleration the plane can perform, maximum ascend, minimum flight speed without stall, and the like.

Further, the prediction may be supplemented with other known spatial data. For example, when knowing the prior location, direction and speed of a car, the likely position of the car may be estimated by route optimization algorithm along the available roads from the last measured location. Spatial knowledge is updated from remote external data sources (over wireless link) such as data feed from Secondary Surveillance Radar (SSR); or from an on-board transceiver/receiver such as on-board SSR and/or ADS-B equipment.

The comparison engine 208 compares the collected spatial data of objects 108 and 110 with the data in the database 214. In an embodiment of the present disclosure, the comparison engine 208 compares the position and pose data of the discovered object 108 with the position and pose data of a model object with which the discovered object 108 matches in the database 214. In an embodiment of the present disclosure, the comparison engine 208 compares the spatial data of discovered object (say object 108) with spatial data in an object model database by comparing a point cloud of the discovered object (say object 108) spatial data with spatial data in the object model database of database 214. In another embodiment of the present disclosure, the comparison engine 208 compares the spatial data of discovered object (say object 108) with spatial data in an object model database by using the technologies presently known in the art.

The position and pose calculator 210 measures the position and pose data of the UAV 102 when the discovered object (say the object 108) spatial data matches spatial data of a model object already stored in the database 214. For example, the position and pose calculator 210 measures the position and pose data of the UAV 102 when the spatial data of the object 108 matches stored spatial data of the model object. Examples of position data include but is not limited to WGS-84 (GPS coordinates) including altitude or relative position and pose to one or more objects or to one or more other UAV's. Similarly, examples of observation data includes but is not limited to two dimensional data, three dimensional data, infrared, high definition data and the like. The updater 212 records and updates the spatial data of the object 108 in the database 214 when the spatial data of discovered object 108 does not match spatial data of a model object in an object model database (not shown in FIG. 2) of the database 214. In an embodiment of the disclosure, the updater 212 updates position and pose data in the object model database of the database 214 when the position and pose data of the discovered object 108 does not match the position and pose data of the model object. In an embodiment of the present disclosure, an alarm 220 transmits an alert from the UAV 102 when the position and pose data of the discovered object 108 does not match the position and pose data of the model object in the object model database of the database 214. The alert is transmitted to the control room 112 and/or to the other UAVs.

In an embodiment of the present disclosure, a search module 216 in the UAV 102 employs spatial, position and poses data of a model object in the object model database of the database 214 to search for a real object using the sensors 202. For example, the control room 112 may transmit the instructions to the UAV 102 to find the object 108 in the geographical area 106. The spatial data of the object 108 is stored in the object model database in the database 214. However, the object 108 may have shifted its position from a previous position to a new position. The data related to the new position may not be present in the database 214. In this example, the search module 216 employs spatial, position and pose data of a model object in the object model database of the database 214 to search for the object 108 using the sensors 202.

In an embodiment of the present disclosure, a navigator 218 changes position and pose of the UAV 102 to enable the search module 216 to research for the object 108 when the object 108 is not sensed at the position of the model object (the previous position).

In this embodiment of the present disclosure, when the discovered object 108 does not match a model object in the object model database of database 214, the sensors 202 repeat collection of spatial data and the comparison engine 208 repeats comparison of the spatial data of object 108 with spatial data in the object model database after the navigator 218 has changed the position and the pose of the UAV 102. Accordingly, when the spatial data of the object 108 matches with spatial data of an already stored model object, the position and pose calculator 210 measures the position and pose data of the UAV 102.

In another embodiment of the present disclosure, a sensor control unit 222 changes the pose or parameters of at least one of the sensors 202 to enable the search module 216 to research for the real object (the object 108) when the real object is not sensed at the position (the previous position) of the model object. In this embodiment of the present disclosure, the sensors 202 repeat collection of spatial data and the comparison engine 208 repeats comparison of the spatial data of object 108 with spatial data in the object model database comparison actions after the sensor control unit 222 has changed the pose or parameters of at least one of the sensors 202 when the discovered object 108 does not match a model object in the object model database of database 214. Accordingly, when the spatial data of the object 108 matches with spatial data of an already stored model object, the position and pose calculator 210 measures the position and pose data of the UAV 102.

Figure 3:
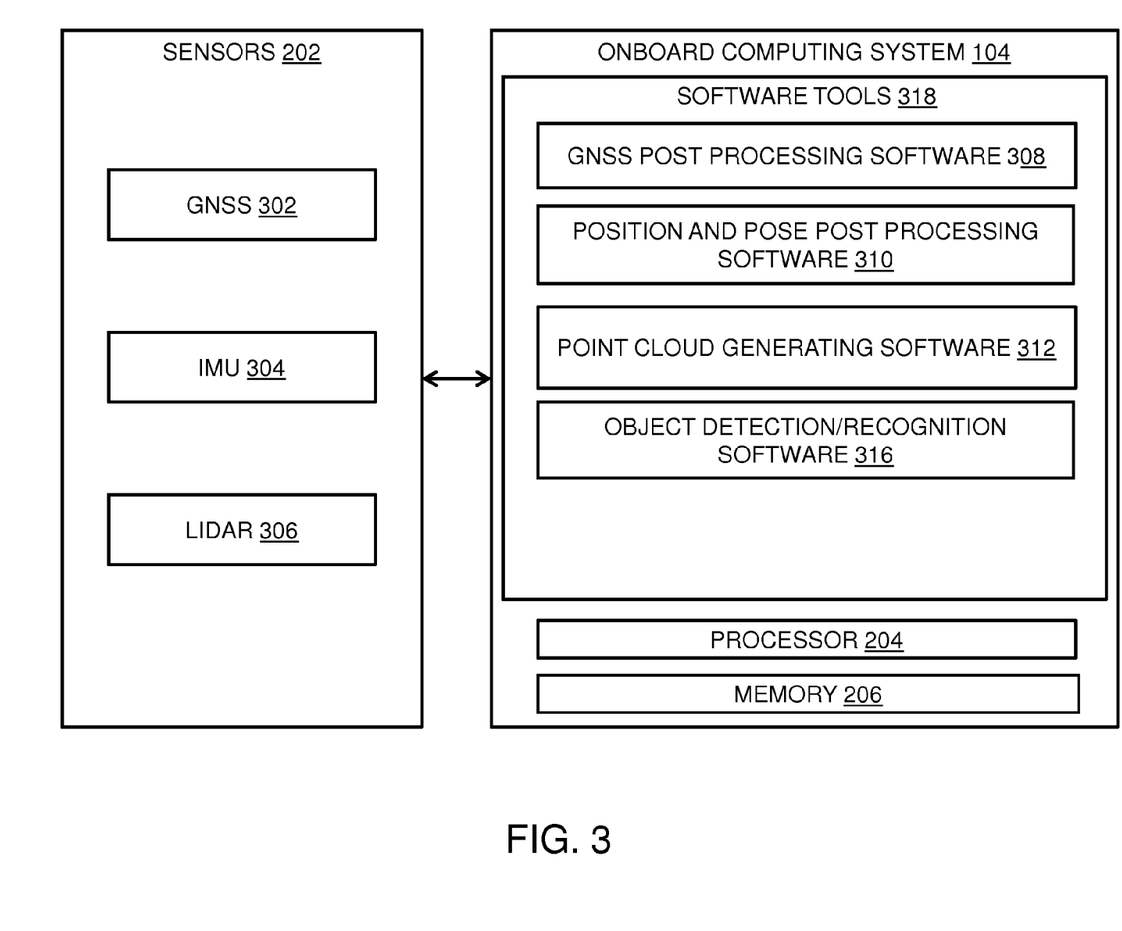
FIG. 3 illustrates interaction between different type of sensors and different types of software tools in an on-board computing system for processing of position and pose of the UAV, in accordance with various embodiments of the present disclosure.

FIG. 3 illustrates interaction between different type of sensors 202 and different types of software tools in the on-board computing system 104 for processing of position and pose of the UAV 102, in accordance with various embodiments of the present disclosure. The sensors 202 include a GNSS 302 to collect GNSS positioning data. The GNSS positioning data include additional attributes such as speed, heading, direction, number of satellites used, timestamp, quality of positioning and the like. In addition, the sensors 202 include an Inertial Measurement Unit (hereinafter IMU) 304 for measuring positioning and pose data and a LIDAR 306. The GNSS 302 collects the positioning data including WGS-84 (GPS coordinates), speed, direction, timestamp, number of satellites used, quality of positioning and the like. The IMU 304 collects positioning and pose data including WGS-84 (GPS coordinates), pitch, latitude, longitude, altitude and the like. The LIDAR 306 collects data including relative angle of rotating/swinging/moving of one or more beams from a known base angle and the distances of objects along the beams and the like. The LIDAR 306 may also be an array based device such as flash LIDAR providing an array of angle and distance measurements. LIDAR 306 may provide distance data either as a discretized echo data or as a full waveform data of the returned flash or pulse. The sensor 202 provides data from GNSS 302, IMU 304 and LIDAR 306 to the onboard computing system 104 for analysis. The onboard computing system 104 includes various software tools 318 to process the data. In an embodiment of the present disclosure, the GNSS 302 provides positioning data to GNSS post processing software 308 to enhance the data and sends the enhanced data to the IMU 304. The IMU 304 provides positioning and pose data to position and pose processing software 310. The position and pose processing software 310 compares the received data with the data in database 214 and provides accurate position and pose data to a point cloud generating software 312. The point cloud consists of LIDAR 306 measurement points associated with a coordinate system. Point cloud generation may include creating three dimensional models of objects including but not limited to, for example, ground and surface models DTM, DEM and DSM. Object detection/recognition software 316 detects objects based on the point cloud data. Accordingly, the processor 204 and memory 206 makes the analysis and observations of three dimensional data.

Figure 4:
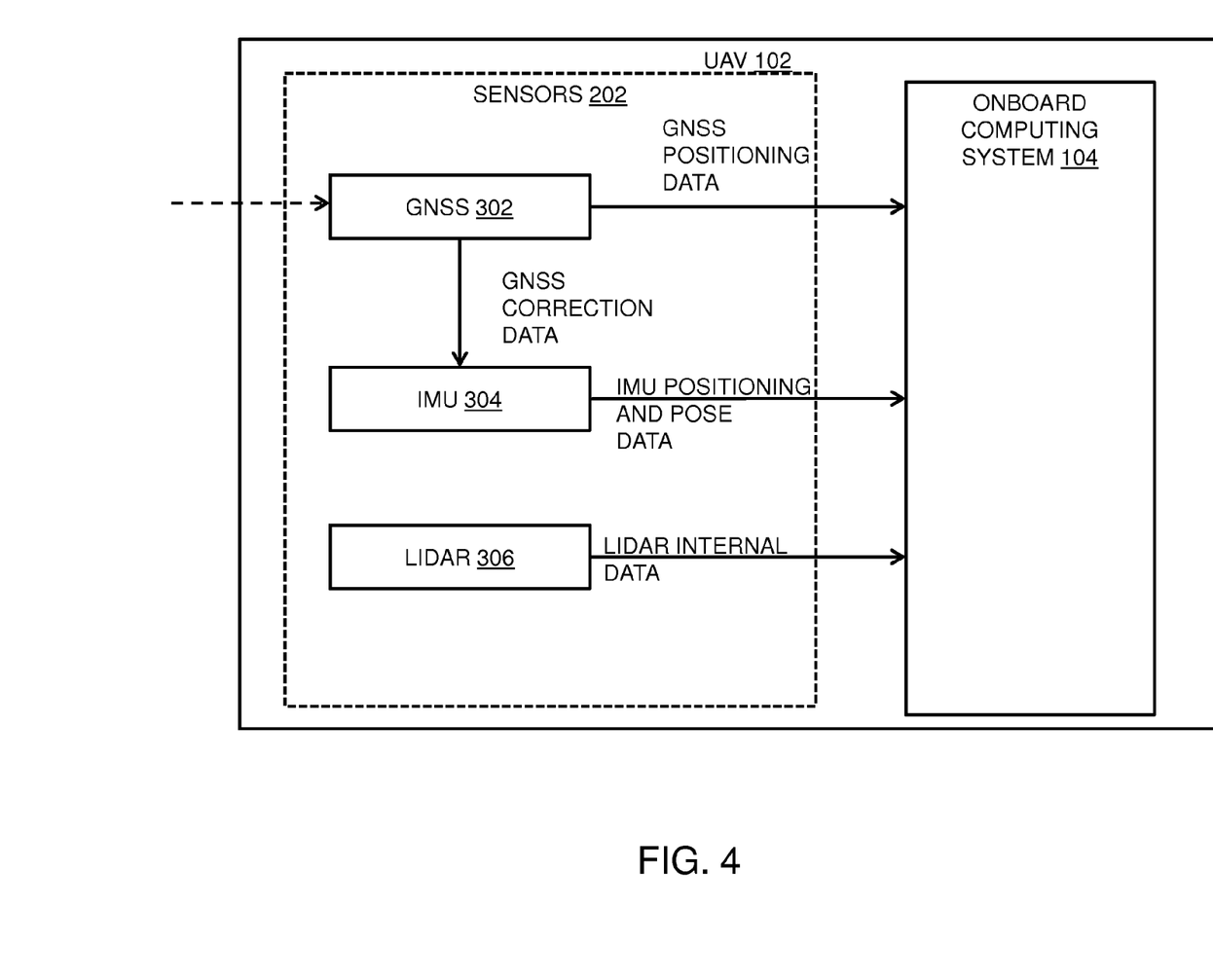
FIG. 4 and FIG. 5 illustrate processing and analysis of data in accordance with various embodiments of the present disclosure.
Figure 5:
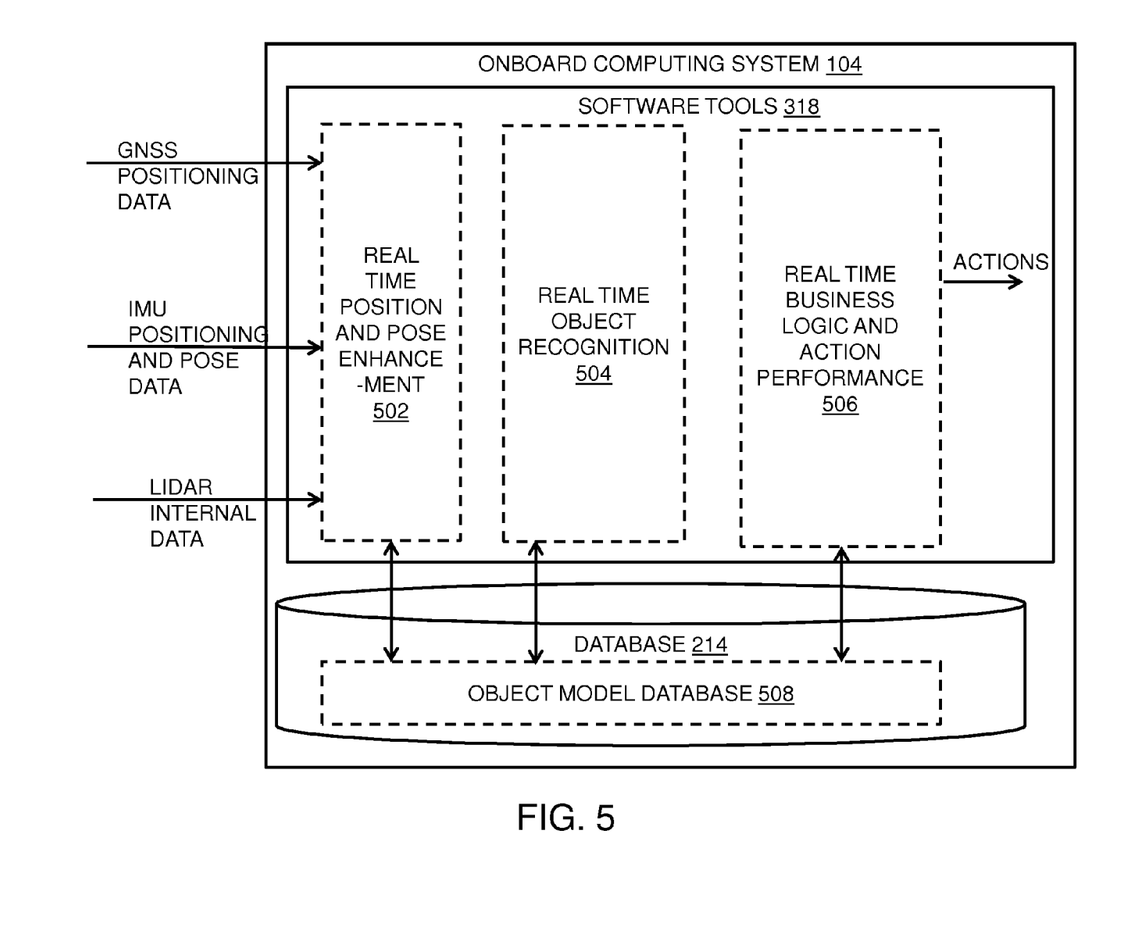

In an embodiment of the present disclosure, as shown in FIG. 4, the position data of the UAV 102 is corrected and accuracy of the position and the pose of the UAV 102 are calculated. Now, as shown in FIG. 5, the data from the sensors 202 is enhanced in real time position and pose enhancement module 502. As mentioned above, the database 214 of the on-board computing system 104 has an object model database 508. The object model database 508 includes information on objects known to be associated with a certain geographical area 106. In an embodiment, the position and pose enhancement is performed by comparing the measurements against the previously known object model. For example, a certain building/bridge is identified from the measurement data, and its known accurate location is used to correct the position information. Optionally, this corrected position information may also be fed to the IMU 304 as correction data. In other embodiments of the present disclosure, the position and pose enhancement is performed by recognizing features (say corners of buildings) with the object model database 508 with previous sensor data set, and detecting the change in position and pose. In another embodiments of the present disclosure, a frame based imaging system in conjunction with various methods presently known in the art are used for detecting the relative orientation of the images. It may be noted that position and pose enhancement based on frame based imaging system data may be performed with the present technologies known in the art.

Once the data is enhanced, the software tools 318 recognize the object in real time (shown as real time recognition module 504). The steps for real time object recognition module 504 includes recognizing and identifying previously known objects (based on prior spatial knowledge stored in object model database 508) and updating the spatial knowledge related to these objects based on measurement data. In another embodiment of the present disclosure, the real time object recognition module 504 includes recognizing previously unknown objects in the measurement data, and creating records for them in the spatial data (thereafter optionally used as prior spatial knowledge and stored in object model database). In yet another embodiment of the present disclosure, the real time object recognition module 504 includes recognizing a previously known object (based on prior spatial knowledge stored in object model database). In an embodiment of the present disclosure, as mentioned above, the spatial knowledge includes at least one of the following object features: a set of coordinates, a shape, a dimension, a size, a pose, speed, velocity, acceleration, path information, topology information, a density, a point distribution, a spectral distribution, a probability distribution, each of which characterizes a certain object type or an individual object of the certain object type. In yet another embodiment of the present disclosure, following the real time object recognition module 504, real time business logic and performance module 506 considers the data in the object model database 508 and contain several business logic rules. These business rules may vary in accordance with different scenarios. For example, if an unknown object appears, an alarm message is sent to the control room 112. If a previously known object cannot be measured, the UAV 102 autopilot or navigator changes to fly closer or around the previously known location of an object. If the instantaneous speed of an object is above or below a certain threshold, the UAV 102 sends the message to another nearby UAV 118. If a hostile GBAD unit is in a shape or formation implying preparedness for launching, the UAV 102 sends the alarm message to other nearby UAV 118. If a tree has fallen onto power line, a message along with images or video from the location to the control room 112 is sent. If a tree is leaning towards power line, the UAV 102 sends a message to the control center 112 with spatial information related to the tree. Similarly, the actions may include changing in the autopilot or navigator programming (such as route, altitude, distance to object, return to base, emergency landing, planned landing to the nearest safe landing site, and the like).

Figure 6:
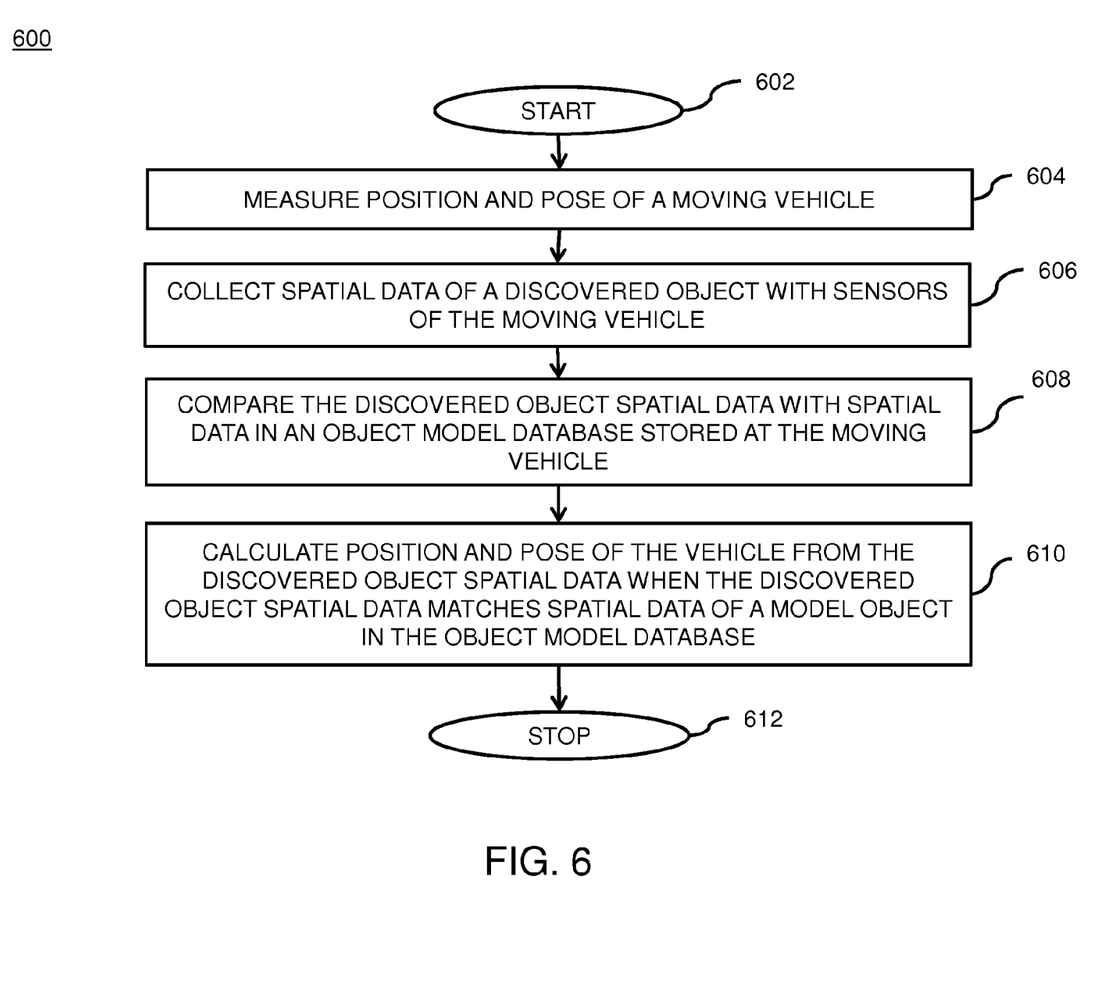
FIG. 6 illustrates a flowchart for remote sensing of objects present in the geographical area, in accordance with various embodiments of the present disclosure.

FIG. 6 illustrates a flowchart 600 for remote sensing of object 108 and object 110 present in the geographical area 106, in accordance with various embodiments of the present disclosure. It may be noted that to explain flow chart 600, references will be made to the system elements of FIGS. 1-5. The flowchart 600 initiates at step 602. At step 604, the on-board computing system 102 collects position and pose of the UAV 102. At step 606, as explained above, sensors 202 of the UAV 102 collects the spatial data of a discovered object 108 or 110. Following step 606, as explained above, at step 608, comparison engine 208 compares the spatial data of discovered objects 108 or 110 with spatial data in the database 214. Further, at step 610, if the spatial data of the discovered object 108 or 110 matches the spatial data of object in the database 214, then position and pose calculator 210 calculates the position and pose of the UAV 102. However, if the spatial data of the object 108 or 110 does not match the object data in the database 214, then updater 212 records the discovered object 108 or 110 data in the database 214. Furthermore, measured position and pose data is processed to enhance the position and pose. Furthermore, the position and pose of the UAV 102 may change, if the real object (108 or 110) is not present at the position of object (108 or 110) in database 214. The flowchart terminates at step 612.

In an example, a UAV 102 such as a drone has LIDAR and GPS. The UAV 102 is programmed to fly over certain area such as over a village. The objective of the mission may be to update an object database related to the village to determine whether there is new construction in the area. In an embodiment of the present disclosure, the UAV 102 is given co-ordinates which define the area such as center coordinate and radius or, for example, corners of geographical shape of square. The UAV 102 is programmed to record and monitor all non-moving objects in the area. UAV flies over the area and starts collecting measurement data of the area. The onboard computing system 104 has as pre-information object data and co-ordinates of the objects in the object model database. As the UAV 102 collects points, the UAV 102 compares the points to objects of the object model database to calibrate positioning systems of the UAV 102.

As the UAV 102 flies over the village, at a given point in time, the UAV 102 observes a large difference between existing data and measured data. The on board computing system 104 analyzes the data and triggers a change in flight plan and re-measures the area in higher accuracy and/or from varying angles.

As the UAV 102 files over certain objects observation data might not be of sufficient quality. For example, leaves of trees might cause disturbances due to wind. The on board computing system 104 performs one or more re-measurements on areas where quality of measurements such as signal to noise ratio from observation sensors is too low.

The UAV 102 can be configured to send data related to found objects, their orientation and type to external systems. The data can have a format: Object_type, location of point in an object, orientation of the object. This way for example data related to position of trees can be communicated by sending info "birch top, at 60N23.324 24W34.3425 at altitude 124 meter, diameter 5 meters, vertical" or "house, corner 1 at 60N22.324 24W31.3425, corner 2 at 60N22.334 24W31.3225, corner 3 xxxx at and corner 4 at xxxx. Height of the house 7 meters."

There can be two or more UAV's (102 and 118) covering same area or in close proximity. Data from the on board computing system 104 of the first UAV 102 can be shared with the second UAV 118 and vice versa. Additionally, first UAV 102 can send request to second UAV 118 to make additional measurements. As such, possible errors arising from artifacts in observation sensors can be avoided and greater measurement redundancy may be achieved. Two or more UAV's 102 and 118 are flying by within a relatively short time interval from each other via same or similar route. Collected observations from the UAV's 102 and 118 are compared to recognize possible moving objects in the area.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. Part of all of the computer program code segments may also be implemented using field-programmable gate array (FPGA) where the computer program code segments are implemented using hardware description language (HDL) to configure the FPGA to create specific logic circuits.

It should be noted that the scope of the disclosure is not limited to the examples described above. In fact, the following represent still further examples.

In an example, the computer-implemented method may include triggering an alert when the position and pose data of the discovered object does not match the position and pose data of the model object. The triggered alert may be transmitted from the vehicle to one or more locations remote from the vehicle.

In an example computer implemented method, comparing the discovered object spatial data with spatial data in an object model database involves comparing a point cloud of the discovered object spatial data with spatial data in the object model database using an identification confidence level.

In an example, instructions of a computer program product may cause a computer to trigger an alert when the position and pose data of a discovered object does not match the position and pose data of a model object. The triggered alert may be transmitted to one or more locations remote from the vehicle in accordance with the instructions.

In an example, instructions of a computer program product causing a computer to compare the discovered object spatial data with spatial data in an object model database involve causing the computer to compare a point cloud of the discovered object spatial data with spatial data in the object model database using an identification confidence level.

In an example, a system may include an alarm arranged to transmit an alert from the vehicle when the position and pose data of the discovered object does not match the position and pose data of the model object.

An example system may include a search module configured to employ spatial, position and pose data of a model object in the object model database to search for a real object using the sensors and a sensor control unit arranged to pose or parameters of at least one of the sensors to enable the search module to research for the real object when the real object is not sensed at the position of the model object.

An example system may include a sensor control unit configured to change pose or parameters of at least one sensor when a discovered object does not match a model object in an object model database. Additionally, a plurality of sensors may be configured to repeat collection of spatial data and a comparison engine may be configured to repeat comparison of the discovered object spatial data with spatial data in the object model database after the sensor control unit has changed pose or parameters of the at least one sensor when the discovered object does not match a model object in the object model database.

Position and pose can refer to position and pose in fixed co-ordinate system such as in reference to WGS-84 and in respect to surface of the earth and direction of heading of the terminal (for example towards North/South). Alternatively/additionally position and pose can refer to relative position and pose to one or more objects or to one or more other UAV's.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A computer program product for remote sensing, the computer program product residing on a non-transitory computer-readable storage medium and comprising instructions which, when executed by a processor, cause a computer to:

measure position and pose of a moving vehicle;
collect spatial data of a discovered object with sensors of the moving vehicle;
collect position and pose data of the discovered object;
compare the discovered object spatial data with spatial data in an object model database comprising object models already stored at the moving vehicle;
calculate position and pose of the vehicle from the discovered object spatial data when the discovered object spatial data matches spatial data of a model object in the object model database;
compare the discovered object position and pose data with position and pose data of a model object having spatial data matching the spatial data of the discovered object; and update the position and pose data in the object model database when the position and pose data of the discovered object does not match the position and pose data of the model object.

2. The computer program product as set forth in claim 1, wherein the instructions further cause the computer to record the discovered object spatial data in the object model database when the discovered object spatial data does not match spatial data of a model object in the object model database.

3. The computer program product as set forth in claim 1, wherein the instructions further cause the computer to processes calculated position and pose of the vehicle with the measured position and pose of the vehicle to yield an enhanced position and pose.

4. The computer program product as set forth in claim 1, wherein the instructions further cause the computer to:
  employ spatial, position and pose data of a model object in the object model database to search for a real object using the sensors; and
  change position and pose of the vehicle and research for the real object when the real object is not sensed at the position of the model object.

5. The computer program product as set forth in claim 1, wherein the instructions further cause the computer to:
  employ spatial, position and pose data of a model object in the object model database to search for a real object using the sensors; and
  change pose or parameters of at least one of the sensors and research for the real object when the real object is not sensed at the position of the model object.

6. The computer program product as set forth in claim 1, wherein when the discovered object does not match a model object in the object model database, the instructions further cause the computer to:
  change position and pose of the vehicle;
  and repeat the collection and comparison actions.

7. The computer program product as set forth in claim 1, wherein when the discovered object does not match a model object in the object model database, the instructions further cause the computer to:
  change pose or parameters of at least one of sensors;
  and repeat the collection and comparison actions.

8. A system for remote sensing, comprising:
  a vehicle including a plurality of sensors configured to measure position and pose of the vehicle and to collect spatial data and position and pose data of a discovered object;
  a storage including an object model database comprising object models already stored at the vehicle;
  a processor;
  a memory including:
    a comparison engine configured to compare the discovered object spatial data with spatial data in the object model database and to compare the discovered object position and pose data with position and pose data of a model object having spatial data matching the spatial data of the discovered obiect;
    a position and pose calculator arranged to calculate position and pose of the vehicle from the discovered object spatial data when the discovered object spatial data matches spatial data of a model object in the object model database; and
    an updater configured to update the position and pose data in the object model database when the position and pose data of the discovered object does not match the position and pose data of the model object.

9. The system as set forth in claim 8, wherein the updater is further configured to record the discovered object spatial data in the object model database when the discovered object spatial data does not match spatial data of a model object in the object model database.

10. The system as set forth in claim 8, further comprising:
  a search module configured to employ spatial, position and pose data of a model object in the object model database to search for a real object using the sensors; and
  a navigator arranged to change position and pose of the vehicle to enable the search module to research for the real object when the real object is not sensed at the position of the model object.

11. The system as set forth in claim 8, further comprising:
  a navigator configured to change position and pose of the vehicle when the discovered object does not match a model object in the object model database; and
  wherein the plurality of sensors are further configured to repeat collection of spatial data and the comparison engine is configured to repeat comparison of the discovered object spatial data with spatial data in the object model database after the navigator has changed the position and the pose of the vehicle when the discovered object does not match a model object in the object model database.

* * * * *